US009608749B2

(12) United States Patent
Mueller et al.

(10) Patent No.: US 9,608,749 B2
(45) Date of Patent: Mar. 28, 2017

(54) MULTI-BAND WIRELESS COMMUNICATION DEVICE WITH MULTIPLEXER AND METHOD OF MULTIPLEXING MULTI-BAND WIRELESS SIGNALS

(75) Inventors: William Carrol Mueller, Mountain View, CA (US); Ray Parkhurst, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 571 days.

(21) Appl. No.: 13/071,863

(22) Filed: Mar. 25, 2011

(65) Prior Publication Data
US 2012/0243446 A1    Sep. 27, 2012

(51) Int. Cl.
  *H04J 1/08* (2006.01)
  *H04B 1/00* (2006.01)
  *H04W 88/06* (2009.01)

(52) U.S. Cl.
  CPC .............. *H04J 1/08* (2013.01); *H04B 1/0057* (2013.01); *H04W 88/06* (2013.01)

(58) Field of Classification Search
  CPC ....................................................... H04J 1/08
  USPC ................. 370/280, 281, 297, 339
  See application file for complete search history.

(56) References Cited

U.S. PATENT DOCUMENTS

| | | | |
|---|---|---|---|
| 6,516,184 B1 | 2/2003 | Damgaard et al. | |
| 6,674,337 B2 | 1/2004 | Hashemi et al. | |
| 6,813,480 B2 | 11/2004 | Losser et al. | |
| 7,269,441 B2 | 9/2007 | Ella et al. | |
| 2002/0090974 A1* | 7/2002 | Hagn | 455/552 |
| 2006/0018254 A1* | 1/2006 | Sanders et al. | 370/216 |
| 2007/0042802 A1* | 2/2007 | Park et al. | 455/552.1 |
| 2007/0077898 A1* | 4/2007 | Mueller et al. | 455/83 |
| 2007/0243832 A1* | 10/2007 | Park et al. | 455/73 |
| 2010/0040184 A1* | 2/2010 | Haralabidis et al. | 375/373 |
| 2010/0197263 A1 | 8/2010 | Dwyer et al. | |
| 2012/0243446 A1* | 9/2012 | Mueller et al. | 370/280 |

* cited by examiner

*Primary Examiner* — Hassan Kizou
*Assistant Examiner* — Ashil Farahmand

(57) ABSTRACT

An apparatus includes: a first multiplexer configured to allow bi-directional communication over a first plurality of multiplexed communication bands that each include a corresponding transmit band and a corresponding receive band, wherein none of the transmit bands of the first multiplexer have transmit frequencies that overlap with any receive frequencies of any of the receive bands of the first multiplexer; a second multiplexer configured to allow bi-directional communication over a second plurality of multiplexed communication bands that each include a corresponding transmit band and a corresponding receive band, wherein none of the transmit bands of the second multiplexer have transmit frequencies that overlap with any receive frequencies of any of the receive bands of the second multiplexer; and an electromechanical band switch configured to selectively connect the first and second multiplexers to a common antenna.

23 Claims, 12 Drawing Sheets

100

| E-UTRA Operating Band | Uplink (UL) operating band BS receive UE transmit $F_{UL\_low}$ – $F_{UL\_high}$ | Downlink (DL) operating band BS transmit UE receive $F_{DL\_low}$ – $F_{DL\_high}$ | Duplex Mode |
|---|---|---|---|
| 1 | 1920 MHz – 1980 MHz | 2110 MHz – 2170 MHz | FDD |
| 2 | 1850 MHz – 1910 MHz | 1930 MHz – 1990 MHz | FDD |
| 3 | 1710 MHz – 1785 MHz | 1805 MHz – 1880 MHz | FDD |
| 4 | 1710 MHz – 1755 MHz | 2110 MHz – 2155 MHz | FDD |
| 5 | 824 MHz – 849 MHz | 869 MHz – 894 MHz | FDD |
| 6 | 830 MHz – 840 MHz | 875 MHz – 885 MHz | FDD |
| 7 | 2500 MHz – 2570 MHz | 2620 MHz – 2690 MHz | FDD |
| 8 | 880 MHz – 915 MHz | 925 MHz – 960 MHz | FDD |
| 9 | 1749.9 MHz – 1784.9 MHz | 1844.9 MHz – 1879.9 MHz | FDD |
| 10 | 1710 MHz – 1770 MHz | 2110 MHz – 2170 MHz | FDD |
| 11 | 1427.9 MHz – 1447.9 MHz | 1475.9 MHz – 1495.9 MHz | FDD |
| 12 | 698 MHz – 716 MHz | 728 MHz – 746 MHz | FDD |
| 13 | 777 MHz – 787 MHz | 746 MHz – 756 MHz | FDD |
| 14 | 788 MHz – 798 MHz | 758 MHz – 768 MHz | FDD |
| 15 | Reserved | Reserved | FDD |
| 16 | Reserved | Reserved | FDD |
| 17 | 704 MHz – 716 MHz | 734 MHz – 746 MHz | FDD |
| 18 | 815 MHz – 830 MHz | 860 MHz – 875 MHz | FDD |
| 19 | 830 MHz – 845 MHz | 875 MHz – 890 MHz | FDD |
| 20 | 832 MHz – 862 MHz | 791 MHz – 821 MHz | FDD |
| 21 | 1447.9 MHz – 1462.9 MHz | 1495.9 MHz – 1510.9 MHz | FDD |
| ... | | | |
| 33 | 1900 MHz – 1920 MHz | 1900 MHz – 1920 MHz | TDD |
| 34 | 2010 MHz – 2025 MHz | 2010 MHz – 2025 MHz | TDD |
| 35 | 1850 MHz – 1910 MHz | 1850 MHz – 1910 MHz | TDD |
| 36 | 1930 MHz – 1990 MHz | 1930 MHz – 1990 MHz | TDD |
| 37 | 1910 MHz – 1930 MHz | 1910 MHz – 1930 MHz | TDD |
| 38 | 2570 MHz – 2620 MHz | 2570 MHz – 2620 MHz | TDD |
| 39 | 1880 MHz – 1920 MHz | 1880 MHz – 1920 MHz | TDD |
| 40 | 2300 MHz – 2400 MHz | 2300 MHz – 2400 MHz | TDD |
| 41 | 2496 MHz – 2690 MHz | 2496 MHz – 2690 MHz | TDD |

110 → E-UTRA Operating Band; 120 → Uplink; 130 → Downlink; 140 → Duplex Mode

FIG. 1
(PRIOR ART)

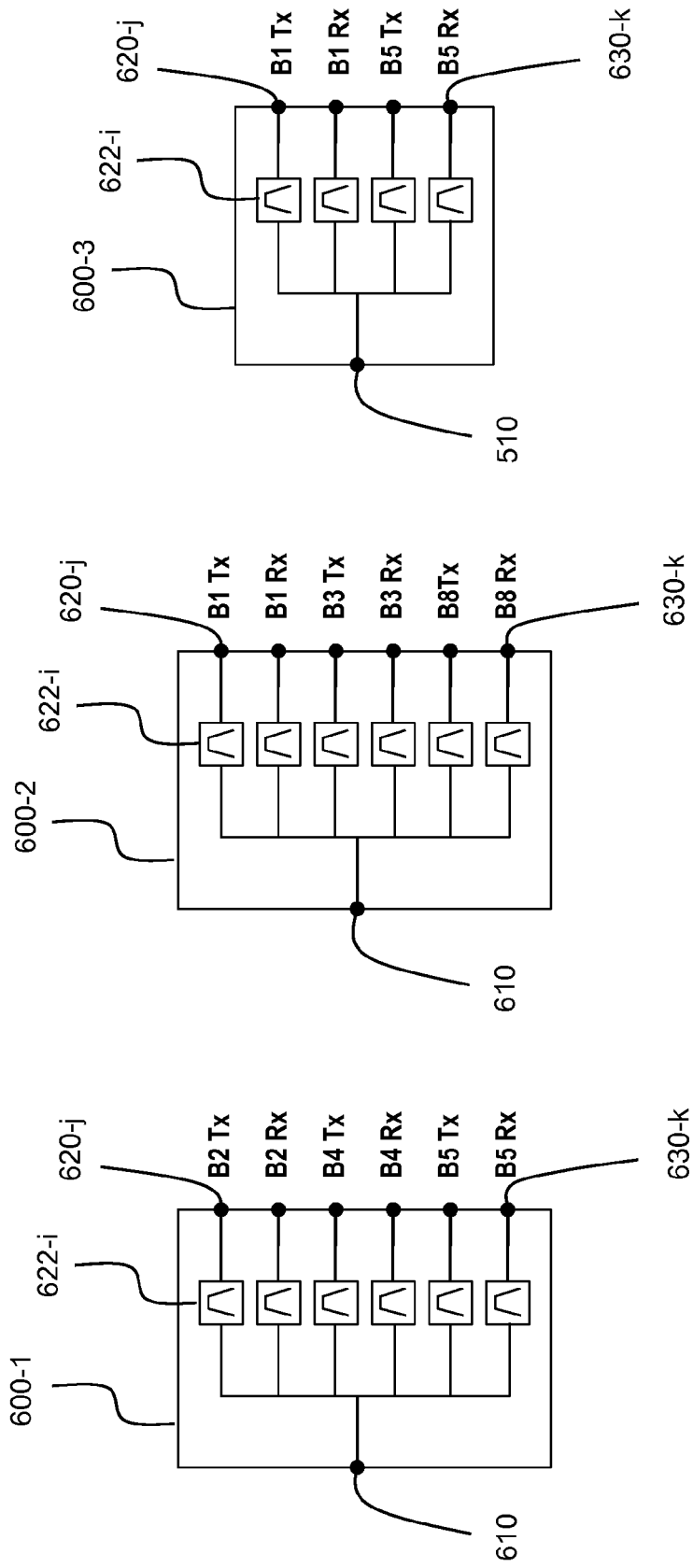

MULTI-BAND WIRELESS COMMUNICATION DEVICE WITH MULTIPLEXER AND METHOD OF MULTIPLEXING MULTI-BAND WIRELESS SIGNALS

BACKGROUND

As mobile telecommunications demands continue to increase, a number of different frequency bands have been allocated for mobile telecommunications in various geographical regions.

FIG. 1 is an example table 100 of mobile telecommunications bands for the evolved UMTS Terrestrial Radio Access Network (E-UTRA) from the $3^{rd}$ Generation Partnership Project (3 GPP). Table 100 shows a plurality of communication bands 110, each communication band including a so-called "up-link" frequency band 120 on which a mobile telecommunication device transmits and a corresponding so-called "down-link" frequency band 130 on which a mobile telecommunication device receives. Hereinafter, "up-link" frequency bands 120 will be referred to as transmit bands 120, and "down-link" frequency bands 130 will be referred to as receive bands 130.

As shown in Table 100, the communication bands 110 span an RF/microwave frequency range of about 700 MHz to 2700 MHz. Associated with each communication band 110 is a corresponding duplex mode 140 for operation, either frequency division duplexing (FDD) or time division duplexing (TDD). It can be seen from FIG. 1 that when a communication band 110 employs FDD operation, then there is a frequency offset between the corresponding transmit band 120 and the corresponding receive band 130, and when a communication band 110 employs TDD operation, then the corresponding transmit band 120 and the corresponding receive band 130 have the same frequency range as each other.

It will be noted that in some cases the transmit bands 120 and/or receive bands 130 of two or more of the communication bands 110 have overlapping frequencies. In general, communication bands 110 with overlapping frequencies are utilized in different geographical regions (e.g., U.S., Europe, Asia, etc.).

Meanwhile, there has been a desire to support non-simultaneous operation in many different communication bands 110 so that one mobile telecommunication device can be used with many different mobile telecommunication systems operating in different communication bands 110, and in some cases in different geographical regions as a user travels from place to place.

FIG. 2 illustrates one example of an arrangement 200 for a transceiver front-end for a mobile telecommunication device that supports non-simultaneous operation in a plurality of different communication bands. Arrangement 200 includes a transmit/received (T/R) and band switch 210, a plurality of duplexers 220-i (here, i (1,6)), and a power amplifier (PA) module 230.

T/R and band switch 210 has a common port 213 connected to an antenna 10, and a plurality of switched ports 215-j (here, j (1,8)) that are selectively coupled to common port 213 under control of a mobile telecommunication device in which arrangement 200 is provided. As shown in FIG. 2, six of the switched ports 215-j are connected to corresponding duplexers 220-i, and two of the switched ports 215-j for GSM Hi bands (1800, 1900 MHz) transmit signal 235 and GSM Lo bands (850, 950) transmit signal 245 are connected to PA module 213.

In general, switches can be divided into two categories: (1) mechanical or electromechanical switches; and electronic switches, including solid state switches. Mechanical or electromechanical switches operate to make or break an electrical connection by connecting and disconnecting a physical contact between two terminals. Examples of mechanical switches include toggle switches, push-button switches, mercury switches, and knife switches. Examples of electromechanical switches include electromagnetic relays, reed switches, and RF microelectromechanical system (MEMS) switches. Examples of electronic switches include diodes, triacs, silicon-controlled rectifiers, transistors (e.g., field effect transistors), and logic gates. In general, electronic switches can operate faster (i.e., higher switching speeds) or with a longer lifetime (i.e., a greater number of switching cycles) compared to mechanical or electromechanical switches. On the other hand, in many applications, and particularly at RF and microwave frequencies, mechanical or electromechanical switches can provide significantly lower insertion losses when the switch is "ON" and greater electrical isolation when the switch is "OFF" than be achieved with electronic switches.

In arrangement 200, T/R and band switch 210 is required to switch very rapidly and repeatedly between transmit and receive switched ports 215-j to support TDD operation, and therefore must be capable of millions of rapid state changes. Accordingly, an electronic switch is used for T/R and band switch 210.

In general, a duplexer is a device that allows bi-directional (duplex) communication over a single communication band at the same time. In arrangement 200, each duplexer 220-i supports a corresponding communication band 110 and includes two filters (e.g., bandpass filters) 222: a transmit filter 222 for the corresponding transmit band 120 and a receive filter for the corresponding receive band 130. Each duplexer 220-i has a common port 223, a transmit port 225, and a receive port 227. Each common port 223 is connected to a corresponding switched port 215-j of T/R+band switch 210. Each transmit port 225 is connected to PA module 230, and each receive port 227 is connected to a receiver circuit for the mobile telecommunication device (not shown in FIG. 2).

Functionally, in the arrangement 200 each switched port 215-j of T/R and band switch 210 supports a different communication band (or part of a different communication band), and only one communication band can be used at a time. Connecting to two or more switched ports 215-j at the same time would cause the circuits attached to each switched port 215-j to unacceptably load one another. Also arrangement 200 can support both TDD and FDD operation, both of which are typically required in many mobile telecommunication devices. Since TDD operation requires T/R and band switch 210 to toggle between transmit and receive states very rapidly and frequently, as noted above this limits the technology that can be used to implement T/R and band switch 210, and this typically results in a significant insertion loss. Since a primary contributor to loss is leakage into open throws, adding throws to T/R and band switch 210 further increases the loss.

Increases in data traffic have created an interest in improved bandwidths. As one way to support higher data throughput, recent releases of the 3 GPP Specification have started to include the potential for multi-carrier use for Radio Access Networks (RANs).

FIG. 3 illustrates provisions for multicarrier operation by a mobile telecommunication device as provided in Release 8, Release 9, and planned future releases of the 3 GPP Specification. As shown in FIG. 3, Release 8 provides for multi-carrier reception by a mobile telecommunication device, but only for carriers or channels within a single communication band. Release 9 provides for simultaneous multi-carrier reception by a mobile telecommunication device of signals with carriers or channels in two or more different communication bands. Planned future releases are expected to provide for simultaneous transmission and reception by a mobile telecommunication device with carriers or channels in two or more different communication bands.

As shown in FIG. 2, arrangement 200 can support multi-carrier or multi-channel reception within a single communication band as provided in Release 8 of the 3 GPP Specification. However, simultaneous multi-band communication as provided in Releases 9 and planned for future releases of the 3 GPP Specification is not possible with arrangement 200.

FIG. 4 illustrates another example of an arrangement 400 for a transceiver front-end for a mobile telecommunication device. Arrangement 400 includes two T/R and band switches 210-1 and 210-2, each connected to a corresponding antenna 20-1 and 20-2. In particular, antenna 20-1 is a hi-band or high frequency antenna handing signals in a frequency range of 1700-2200 MHz, and antenna 20-2 is a low-band or low frequency antenna handing signals in a frequency range of 800-1000 MHz.

In the arrangement 400, some simultaneous operation in different communication bands can be supported, as long as the different communication bands are connected to separate antennas. In arrangement 400, one high frequency communication band and one low frequency communication band could be operated at the same time via the separate hi-band antenna 20-1 and low-band antenna 20-2.

However in arrangement 400 the number of bands available for simultaneous communication cannot exceed the number of antennas. Furthermore, there is a fundamental limitation on the flexibility of selecting which communication bands can be operated at the same time. That is, only pairs of communication bands that are connected to different antennas can be utilized at the same time.

What is needed, therefore, is an arrangement for a front end of a mobile telecommunications device that can allow for simultaneous multi-band communication without requiring separate antennas for each simultaneously-operated communication band.

In an example embodiment, an apparatus comprises: a first multiplexer configured to allow bi-directional communication over a first plurality of multiplexed communication bands that each include a corresponding transmit band and a corresponding receive band, wherein none of the transmit bands of the first multiplexer have transmit frequencies that overlap with any receive frequencies of any of the receive bands of the first multiplexer; a second multiplexer configured to allow bi-directional communication over a second plurality of multiplexed communication bands that each include a corresponding transmit band and a corresponding receive band, wherein none of the transmit bands of the second multiplexer have transmit frequencies that overlap with any receive frequencies of any of the receive bands of the second multiplexer; and an electromechanical band switch configured to selectively connect the first and second multiplexers to a common antenna.

In another example embodiment, a method comprises: multiplexing to a first common port a first plurality of communication bands each supporting a corresponding bi-directional communication signal that includes a corresponding transmit signal that is transmitted in a corresponding transmit band and a corresponding receive signal that is received in a corresponding receive band; multiplexing to a second common port a second plurality of communication bands each supporting a corresponding bi-directional communication signal that includes a corresponding transmit signal that is transmitted in a corresponding transmit band and a corresponding receive signal that is received in a corresponding receive band; and selectively connecting one of the first common port and the second common port to an antenna.

In yet another example embodiment, an apparatus comprises: one or more receivers; one or more transmit amplifiers; a first multiplexer having a common port, a plurality of transmit ports connected to the one or more transmit amplifiers, and a plurality of receive ports connected to the one or more receivers; a second multiplexer having a common port, a plurality of transmit ports connected to the one or more transmit amplifiers, and a plurality of receive ports connected to the one or more receivers; and an electromechanical band switch configured to selectively connect the first and second multiplexers to an antenna.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 1 is an example table of mobile telecommunications bands for the evolved UMTS Terrestrial Radio Access Network (E-UTRA) from the $3^{rd}$ Generation Partnership Project (3 GPP).

FIGS. 6A-C illustrate three example multiplexers that may be employed in a transceiver front-end for a mobile telecommunication device that supports simultaneous operation in a plurality of different communication bands.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

As used herein, the term "radio frequency" or "RF" pertains to VHF, UHF, SHF, microwave and even millimeter wave frequencies to the extent that technology permits the devices and circuits disclosed herein to be fabricated and operated at such frequencies. Also, unless otherwise noted, when a first device is said to be connected or coupled to a second device, this encompasses cases where one or more intermediate devices may be employed to connect the two devices to each other. In contrast, when a first device is said to be directly connected or directly coupled to a second device, this encompasses cases where the two devices are connected together without any intervening devices except any necessary electrical wires. As used herein, "approximately" means within 10%, and "substantially" means at least 75%.

Figures 5A, 5B:
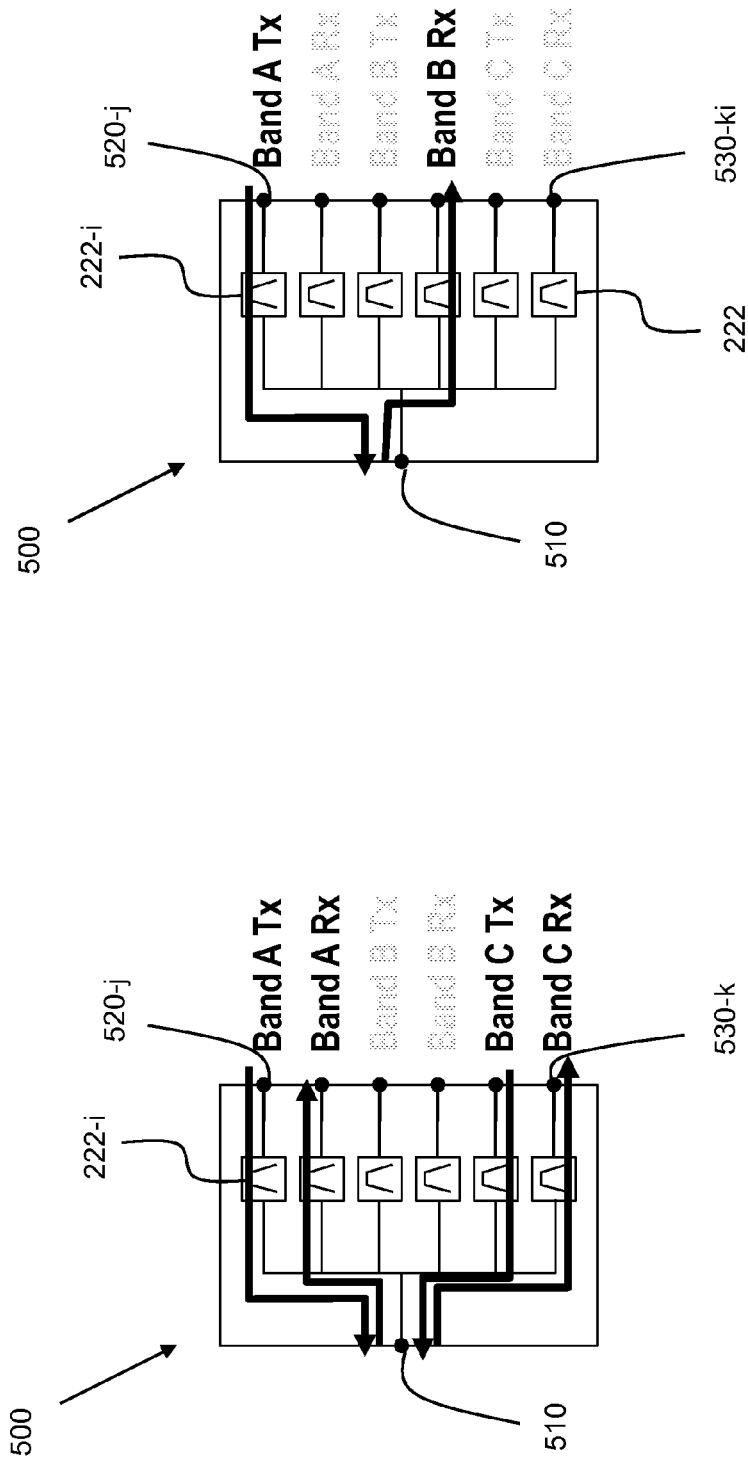
FIGS. 5A-B illustrate multiplexing of communication channels for a wireless telecommunication device.

FIGS. 5A-B illustrate multiplexing of communication channels for a wireless telecommunication device. In particular, FIGS. 5A-B illustrate operation of a multiplexer 500. Multiplexer 500 includes a common port 510, a plurality of transmit ports 520-$j$ (here, j (1,3)), and a plurality of receive ports 530-$k$ (here, k (1,3)). Each of the transmit ports 520-$j$ is configured to pass transmit frequencies in a corresponding transmit band to common port 510, and each of the receive ports 530-$k$ is configured to receive frequencies in a corresponding receive band from common port 510. A corresponding bandpass filter 522-$i$ (here, i (1,6)) is connected between each transmit port 520-$j$ and common port 510, and a corresponding bandpass filter 522-$i$ is connected between each receive port 530-$k$ and common port 510.

In a mobile telecommunication device, common port of multiplexer 500 is connected to an antenna (e.g., via a switch as described in greater detail below), transmit ports 520-$j$ are connected to one or more transmit amplifiers, and receive ports 530-$k$ are connected to one or more receivers.

Operationally, multiplexer 500 is configured to allow bi-directional communication over a first plurality of multiplexed communication bands (e.g., communication band A, communication band B, and communication band C) that each include a corresponding transmit band (e.g., Band A Tx, Band B Tx, and Band C Tx) and a corresponding receive band (e.g., Band A Rx, Band B Rx, and Band C Rx).

Furthermore, as shown in FIG. 5A, simultaneous operation is possible on two communication bands (e.g., communication band A and communication band C) at the same time. That is, with multiplexer 500, it is possible to simultaneously: transmit a first transmit signal for Band A TX provided at a first one of the transmit ports of the first multiplexer; transmit a second transmit signal for Band B TX provided at a second one of the transmit ports of the first multiplexer; receive a first receive signal for Band A Rx supplied to a first one of the receive ports; and receive a second receive signal for Band B Rx supplied to a second one of the receive ports.

However, there can be a problem for simultaneous operation with multiplexer 500 if the communication band A, communication band B, and communication band C are not carefully chosen. In particular, a necessary constraint is that there is no overlap between the transmit frequencies of the transmit band of one communication band and the receive frequencies of the receive band of another communication band. If the transmit band (e.g., Band A Tx) of one communication band overlaps the receive band (e.g., Band B Rx) of another communication band, multiplexing cannot be applied due to signal leakage from the transmit signal to the receiver.

For example, referring back to Table 100 in FIG. 1, communication band 1, which is used in Europe, and communication band 2, which is used in the U.S., cannot be multiplexed together in a single multiplexer 500 due to frequency overlap between transmit band 1 (1920-1980 MHz) and receive band 2 (1930-1990 MHz). Similarly communication band 5, which is used in the U.S., and communication band 8, which is used in the Europe, cannot be multiplexed together in a single multiplexer 500 due to frequency overlap between transmit band 8 (880-915 MHz) and receive band 5 (869-894 MHz).

An additional practical constraint for multiplexer 500 is the amount of effective loss the multiplexer introduces in transmit and receive paths of a mobile telecommunication devices. Each added filter for each added transmit or receive band does have some impact on the overall effective insertion loss seen by any given band. However with today's technology, and depending on the requirements of a particular mobile telecommunication device, three or four different bands can be multiplexed before the insertion loss penalty starts to become unacceptable.

One way to make use of multiplexing is to combine bands found in a single geography at a common output node. Accordingly, FIGS. 6A-C illustrate three example multiplexers 600-1, 600-2, and 600-3 that may be employed in a transceiver front-end for a mobile telecommunication device that supports simultaneous operation in a plurality of different communication bands. In FIGS. 6A-C, and going forward in FIGS. 7-12, the transmit band numbers and receive band numbers illustrated in the drawings correspond to the transmit band numbers and receive band numbers listed in Table 100 of FIG. 1. That is, B1 Tx corresponds to transmit band 1 in Table 100 (i.e., 1920-1980 MHz), B1 Rx corresponds to receive band 1 in Table 100 (i.e., 2110-2170 MHz), B3 Tx corresponds to transmit band 3 in Table 100 (i.e., 1710-1785 MHz), etc.

As shown in FIG. 6A: multiplexer 600-1 multiplexes together communication bands 2, 4 and 5 which are used in the U.S.; multiplexer 600-2 multiplexes together communication bands 1, 3 and 8 which are used in Europe; and multiplexer 600-1 multiplexes together communication bands 1 and 5 which are used in Asia.

Multiplexer 600-1 supports simultaneous multi-band communication in the U.S. as provide by Release 9 and planned future releases of the 3 GPP specification. Similarly, multiplexer 600-2 supports simultaneous multi-band communication in Europe, and multiplexer 600-3 supports simultaneous multi-band communication in Asia.

It should be understood that the multiplexers 600-1, 600-2, and 600-3 shown in FIGS. 6A-C are only examples, and that multiplexers combining different combinations of communication bands are possible.

Figure 7:
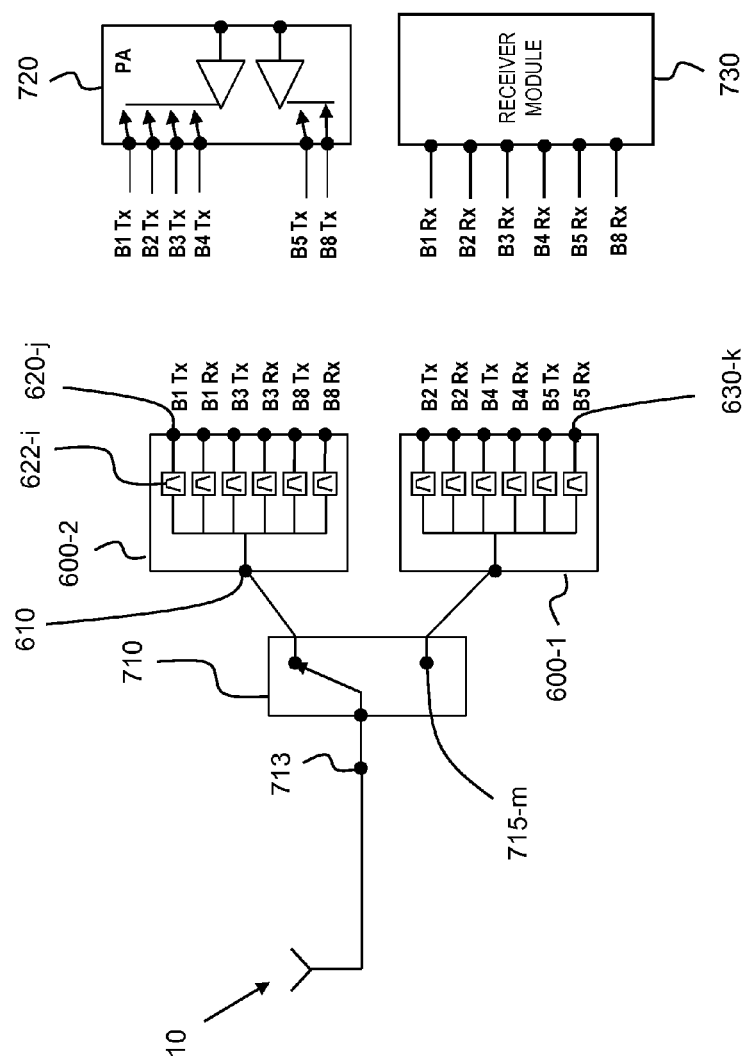
FIG. 7 illustrates a first example embodiment of a transceiver for a mobile telecommunication device that supports simultaneous operation in a plurality of different communication bands.

FIG. 7 illustrates a first example embodiment of a transceiver 700 for a mobile telecommunication device that supports simultaneous operation in a plurality of different communication bands. Transceiver 700 includes a band switch 710, first and second multiplexers 600-1 and 600-2, a transmit amplifier module 720, and a receiver module 730.

Transmit amplifier module 720 includes one or more transmit amplifiers (e.g., different transmit amplifiers for different frequency ranges), and receiver module 730 includes one or more receivers (e.g., different receivers for different frequency ranges, different receive signal formats, etc.). Transmit amplifier module 720 can be configured in a variety of different ways than that shown in FIG. 7. For example, in some embodiments, transmit amplifier module 720 may include a converged power amplifier that supports TDD GSM plus multiple FDD UMTS bands. In other embodiments, transmit amplifier module 720 may include multiple separate power amplifiers (e.g., a multiband UMTS power amplifier plus a GSM power amplifier, or multiple UMTS band power amplifiers plus a GSM power amplifier, etc.). Many other arrangements are possible. Similarly, in some embodiments receiver module 730 may include one "receiver" for each band, while in other embodiments, switches, diplexers or the like could be used to allow two bands (usually from different geographies) to share a receiver port of receiver module 730. Again, many other arrangements are possible.

First multiplexer 600-1 has a common port 610, a plurality of transmit ports 620-*j* (here, j (1,3)) connected to the one or more transmit amplifiers of transmit amplifier module 720, and a plurality of receive ports 630-*ki* (here, k (1,3)) connected to the one or more receivers of receiver module 730. First multiplexer 600-1 includes a plurality of bandpass filters 622-*i* (here, (1,6)), each of the bandpass filters 622-*i* corresponding to one of the transmit bands (B2 Tx, B4 Tx, or B5 Tx) of first multiplexer 600-1 or one of the receive bands (B2 Rx, B4 Rx, or B5 Rx) of first multiplexer 600-1. Each of the transmit ports 620*j* of first multiplexer 600-1 is configured to pass transmit frequencies in a corresponding transmit band (B2 Tx, B4 Tx, or B5 Tx) to common port 610 of first multiplexer 600-1, and each of the receive ports 630-*k* of first multiplexer 600-1 is configured to receive frequencies in a corresponding receive band (B2 Rx, B4 Rx, or B5 Rx) from common port 610 of first multiplexer 600-1. In a beneficial feature, none of the transmit frequencies of any of the transmit bands (B2 Tx, B4 Tx, or B5 Tx) of first multiplexer 600-1 overlap any of the receive frequencies of any of the receive bands (B2 Rx, B4 Rx, or B5 Rx).

Second multiplexer 600-2 also has a common port 610, a plurality of transmit ports 620-*j* (here,*j* (1,3)) connected to the one or more transmit amplifiers of transmit amplifier module 720, and a plurality of receive ports 630-*k* (here, k (1,3)) connected to the one or more receivers of receiver module 730. Second multiplexer 600-2 also includes a plurality of bandpass filters 622-I (here, i (1,6)), each of the bandpass filters 622-*i* of second multiplexer 600-2 corresponding to one of the transmit bands (B1 Tx, B3 Tx, or B8 Tx) of second multiplexer 600-2 or one of the receive bands (B1 Rx, B3 Rx, and B8 Rx) of second multiplexer 600-2. Each of the transmit ports 620-*j* of second multiplexer 600-2 is configured to pass transmit frequencies in a corresponding transmit band (B1 Tx, B3 Tx, or B8 Tx) to common port 610 of second multiplexer 600-2, and each of the receive ports 630-*k* of first multiplexer 600-1 is configured to receive frequencies in a corresponding receive band (B1 Rx, B3 Rx, or B8 Rx) from common port 610 of second multiplexer 600-2. In a beneficial feature, none of the transmit frequencies of any of the transmit bands (B1 Tx, B3 Tx, or B8 Tx) of second multiplexer 600-2 overlap any of the receive frequencies of any of the receive bands (B1 Rx, B3 Rx, or B8 Rx).

Operationally, first multiplexer 600-1 is configured to allow bi-directional communication over a first plurality of multiplexed communication bands (communication band 2, communication band 4, and communication band 5) that each include a corresponding transmit band (B2 Tx, B4 Tx, and B5 Tx) and a corresponding receive band (B2 Rx, B4 Rx, and B5 Rx). In a beneficial feature, first multiplexer 600-1 is configured to support simultaneous communication over two or more of its multiplexed communication bands as provided by Release 9 and planned future releases of the 3 GPP specification. For example, with first multiplexer 600-1 it is possible to simultaneously: transmit via antenna 10 a first transmit signal supplied by transmit amplifier module 720 to a first one of the transmit ports 620-*j* of first multiplexer 600-1; transmit via antenna 10 a second transmit signal supplied by transmit amplifier module 720 to a second one of the transmit ports 620-*j* of first multiplexer 600-1; receive via antenna 10 a first receive signal supplied to receiver module 730 from a first one of the receive ports 630-*k* of first multiplexer 600-1; and receive via antenna 10 a second receive signal supplied to receiver module 730 from a second one of the receive ports 630-*k* of first multiplexer 600-1.

Similarly, second multiplexer 600-2 is configured to allow bi-directional communication over a second plurality of multiplexed communication bands (communication band 1, communication band 3, and communication band 8) that each include a corresponding transmit band (B1 Tx, B3 Tx, and B8 Tx) and a corresponding receive band (B1 Rx, B3 Rx, and B8 Rx). In a beneficial feature, second multiplexer 600-2 is configured to support simultaneous communication over two or more of its multiplexed communication bands as provided by Release 9 and planned future releases of the 3 GPP specification. For example, with second multiplexer 600-2 it is possible to simultaneously: transmit via antenna 10 a first transmit signal supplied by transmit amplifier module 720 to a first one of the transmit ports 620-*j* of second multiplexer 600-1; transmit via antenna 10 a second transmit signal supplied by transmit amplifier module 720 to a second one of the transmit ports 620-*j* of second multiplexer 600-2; receive via antenna 10 a first receive signal supplied to receiver module 730 from a first one of the receive ports 630-*k* of second multiplexer 600-2; and receive via antenna 10 a second receive signal supplied to receiver module 730 from a second one of the receive ports 630-*k* of second multiplexer 600-2.

Figure 2:
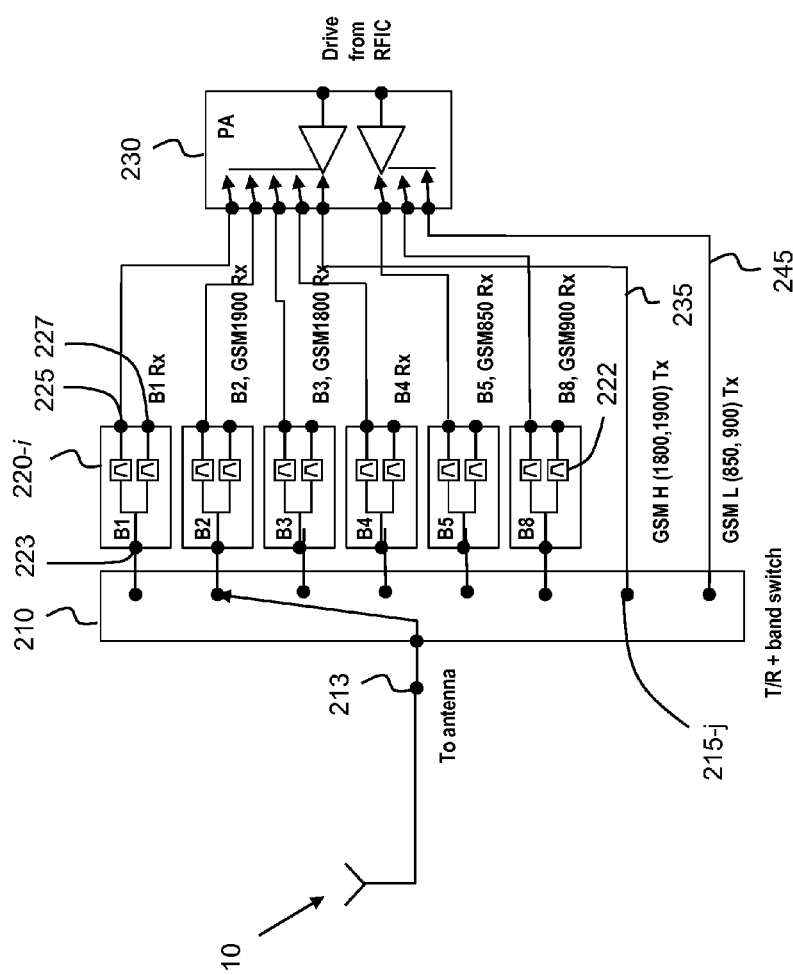
FIG. 2 illustrates one example of an arrangement for a transceiver front-end for a mobile telecommunication device that supports non-simultaneous operation in a plurality of different communication bands.
Figure 3:
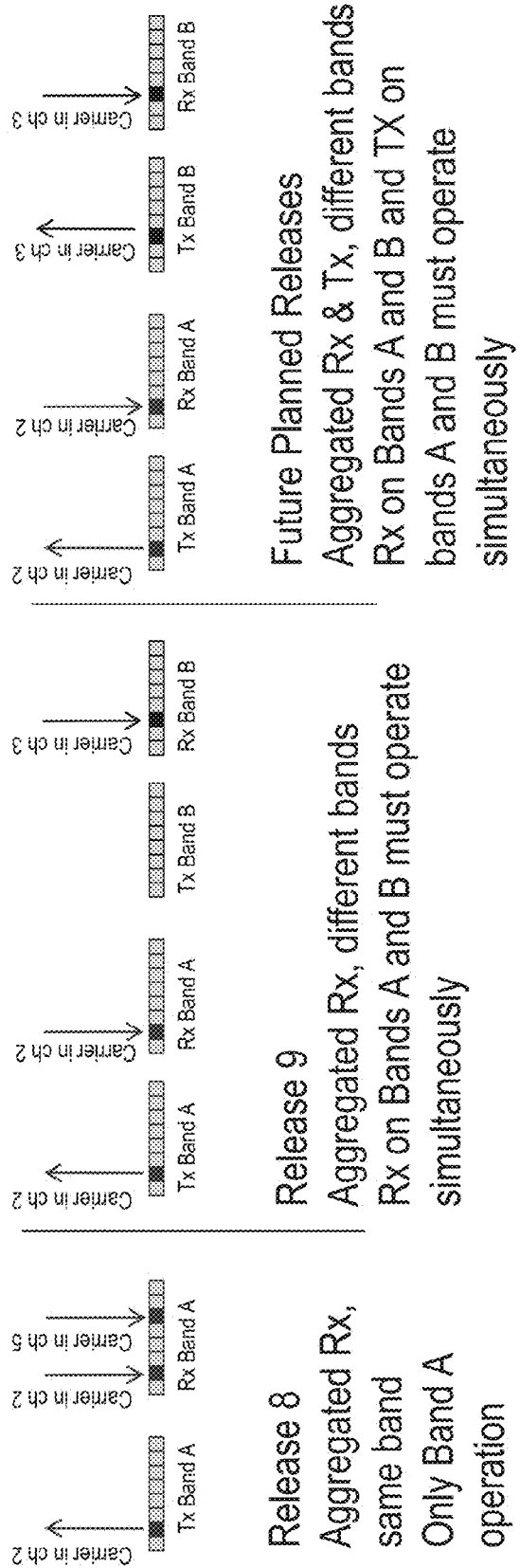
FIG. 3 illustrates provisions for multicarrier operation in Release 8, Release 9, and planned future releases of the 3 GPP Specification.
Figure 4:
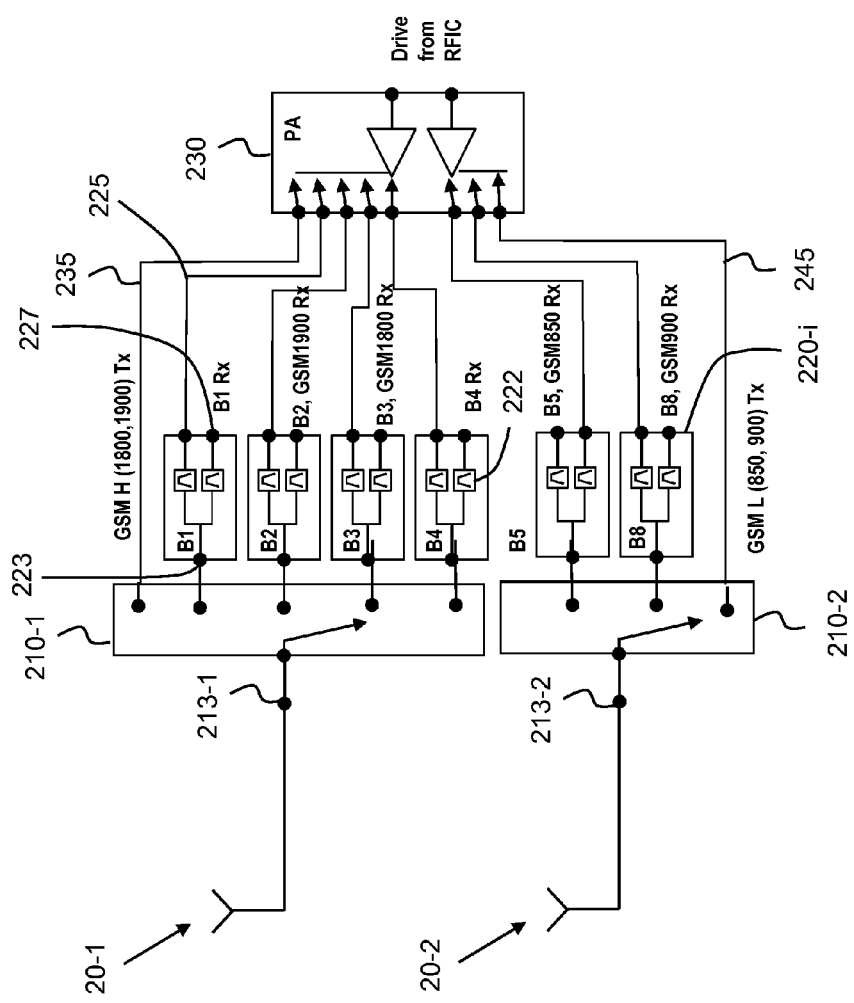
FIG. 4 illustrates another example of an arrangement for a transceiver front-end for a mobile telecommunication device.

In a beneficial feature, in some embodiments the additional insertion loss for first multiplexer 600-1 and second multiplexer 600-2 from each additional bandpass filter 622-*i* is less than 0.15 dB per filter, so that the added loss for first multiplexer 600-1 and second multiplexer 600-2 is only about 0.4-0.6 dB, compared to a conventional duplexer 220-*i* as shown for example in FIGS. 2 and 4.

The first plurality of communication bands (communication band 2, communication band 4, and communication band 5) of first multiplexer 600-1 are allocated within the United States for mobile telecommunications, and the second plurality of communication bands (communication band 1, communication band 3, and communication band 8) of second multiplexer 600-2 are allocated in Europe for mobile telecommunications. Accordingly, first multiplexer 600-1 supports simultaneous multi-band communication in a first geographical region (e.g., the U.S.), and second multiplexer 600-2 supports simultaneous multi-band communication in a second geographical region (e.g., Europe).

Because each of the first and second multiplexers 600-1 and 620-2 aggregates communication bands for a separate geographical region, band switch 710 will only need to be switched when a user changes their geographical region of operation. So band switch 710 does not need to be capable of millions or billions of switching cycles without failure, and switching speed is also not a factor. Accordingly in another beneficial feature, band switch 710 is an electromechanical band switch to minimize the insertion loss in the transmit paths and receive paths of transceiver 700. In one beneficial embodiment, electromechanical band switch 710 is an RF microelectromechanical system (MEMS) switch. In some embodiments, the insertion loss of such an RF MEMS switch may be about 0.1 dB, which is considerable less than what might be expected (e.g., 0.5-0.7 dB) if an electronic switch was employed.

Electromechanical band switch 710 includes a common port 713 which is connected to antenna 10, and a plurality of switched ports 715-m here, m (1,2)) each connected to one of the first and second multiplexers 600-1 and 600-2.

Electromechanical band switch 710 is configured to selectively connect first and second multiplexers 600-1 and 600-2 to a common antenna 10. That is, electromechanical band switch 710 is configured to selectively connect common antenna 10 to only one of the first and second multiplexers 600-1 and 600-2 at a given time.

Transmit amplifier module 720 includes one or more transmit amplifiers and has a plurality of outputs. At least two of the outputs of amplifier module 720 are connected to two corresponding bandpass filters 622-$i$ of first multiplexer 600-1 for at least two of the transmit bands (e.g., B2 Tx, B4 Tx, and B5 Tx) of first multiplexer 600-1. Also, at least a first one of the outputs of amplifier module 720 is connected to one of the bandpass filters 622-$i$ of first multiplexer 600-1 for one of the transmit bands (e.g., B2 Tx) of first multiplexer 600-1, and at least a second one of the outputs of amplifier module 720 is connected to one of the bandpass filters 622-$i$ of second multiplexer 600-2 for one of the transmit bands (e.g., B1 Tx) of second multiplexer 600-2.

It should be understood that the multiplexers 600-1 and 600-2 shown in FIG. 7 are only example configurations, and that multiplexers combining different combinations of communication bands are possible. Also, in other embodiments more than two multiplexers may be provided for selection by electromechanical band switch 710.

The arrangement shown in FIG. 7 only supports frequency division duplexing (FDD) operation. However, this arrangement can be extended to cover time domain duplexing (TDD) operation by adding a transmit/receive (T/R) switch as shown in FIG. 8.

Figure 8:
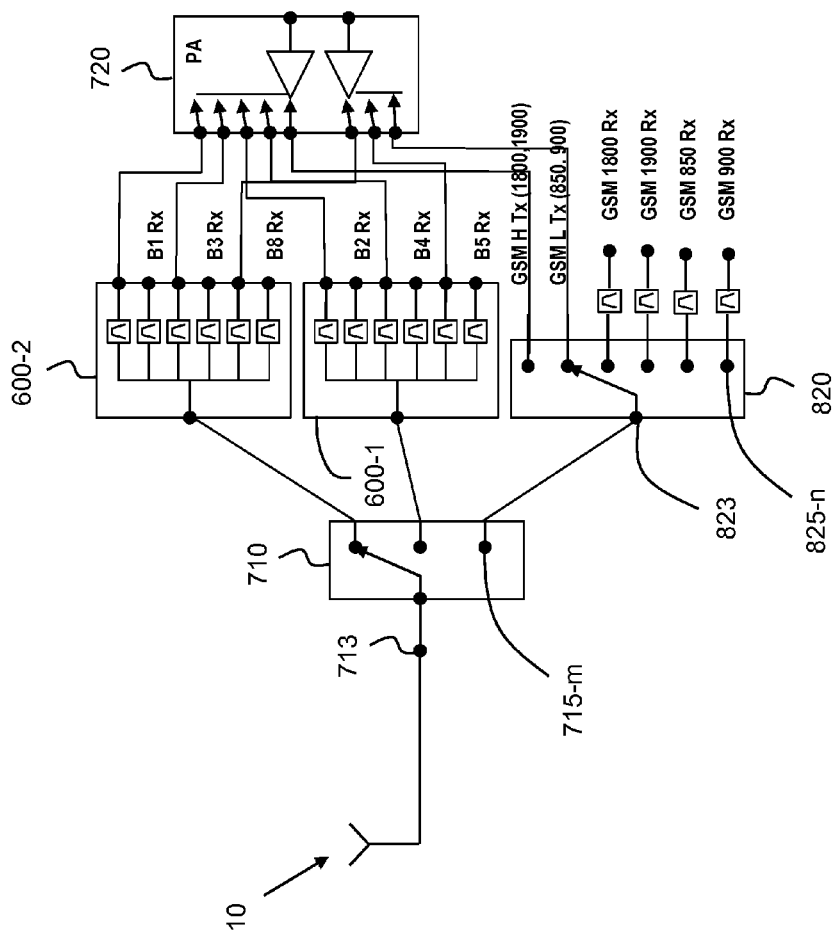
FIG. 8 illustrates a second example embodiment of an arrangement for a transceiver front-end for a mobile telecommunication device that supports simultaneous operation in a plurality of different communication bands.

FIG. 8 illustrates a second example embodiment of an arrangement 800 for a transceiver front-end for a mobile telecommunication device that supports simultaneous operation in a plurality of different communication bands, and supports both FDD and TDD operation. For brevity, only the differences between the arrangement 800 in FIG. 8 and the corresponding arrangement in FIG. 7 will be described.

In arrangement 800, electromechanical band switch 710 includes three switched ports 715-$m$, and a transmit/receive (T/R) switch 820 is connected to one of the switched ports 715-$m$.

T/R switch 820 includes a common port 823 and a plurality of switched ports 825-$n$ (e.g., n (1,6)). In arrangement 800, two of the switched ports 825-$n$ of T/R switch 820 are connected to power amplifier module 720 and configured to receive a transmit signal from transmit amplifier module 720 for a time-division duplex (TDD) signal, and four of the switched ports 825-$n$ of T/R switch 820 are connected to a receiver (e.g., receiver module 730 shown in FIG. 7) for a time-division duplex (TDD) signal. To support TDD operation, T/R switch 820 is an electronic switch which can be switched rapidly and has a very high reliability to support the millions of switching cycles required in a TDD mode for switching between a transmit mode and a receive mode, for example for switching between GSM L Tx (1900) and GSM R Tx (1900) for communication band 33 in Table 100.

In arrangement 800, electromechanical band switch 710 is further configured to selectively connect common port 823 of T/R switch 820 to the antenna 10.

Figure 9:
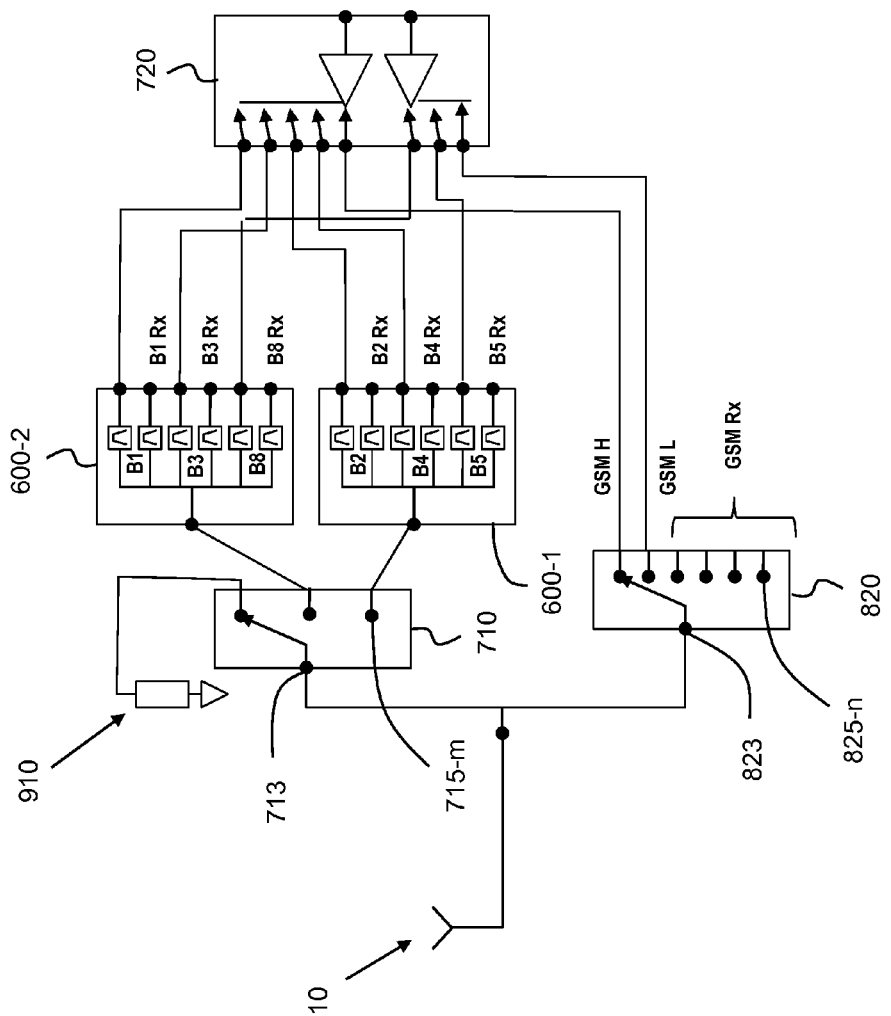
FIG. 9 illustrates a third example embodiment of an arrangement for a transceiver front-end for a mobile telecommunication device that supports simultaneous operation in a plurality of different communication bands.

FIG. 9 illustrates a third example embodiment of an arrangement 900 for a transceiver front-end for a mobile telecommunication device that supports simultaneous operation in a plurality of different communication bands, and supports both FDD and TDD operation. For brevity, only the differences between the arrangement 900 in FIG. 9 and the arrangements described above will be described.

In contrast to arrangement 800 where common port 823 of electronic T/R switch 820 is connected to antenna 10 via electromechanical band switch 710, in arrangement 900 common port 823 of electronic T/R switch 820 is directly connected to antenna 10 together with common port 713 of electromechanical band switch 710. Also, one of the switched ports 715-$m$ of electromechanical band switch 710 is connected to an impedance termination 910 so that when arrangement 900 is operating in TDD mode, the path to common port 713 of electromechanical band switch 710 will be properly terminated. However, in some embodiments impedance termination 910 may be omitted.

The architectures illustrated above with respect to FIGS. 7-9 can be extended by adding one or more additional electromechanical band switches and/or by adding additional poles (switched ports 715-$m$) to electromechanical band switch 710.

Figure 10:
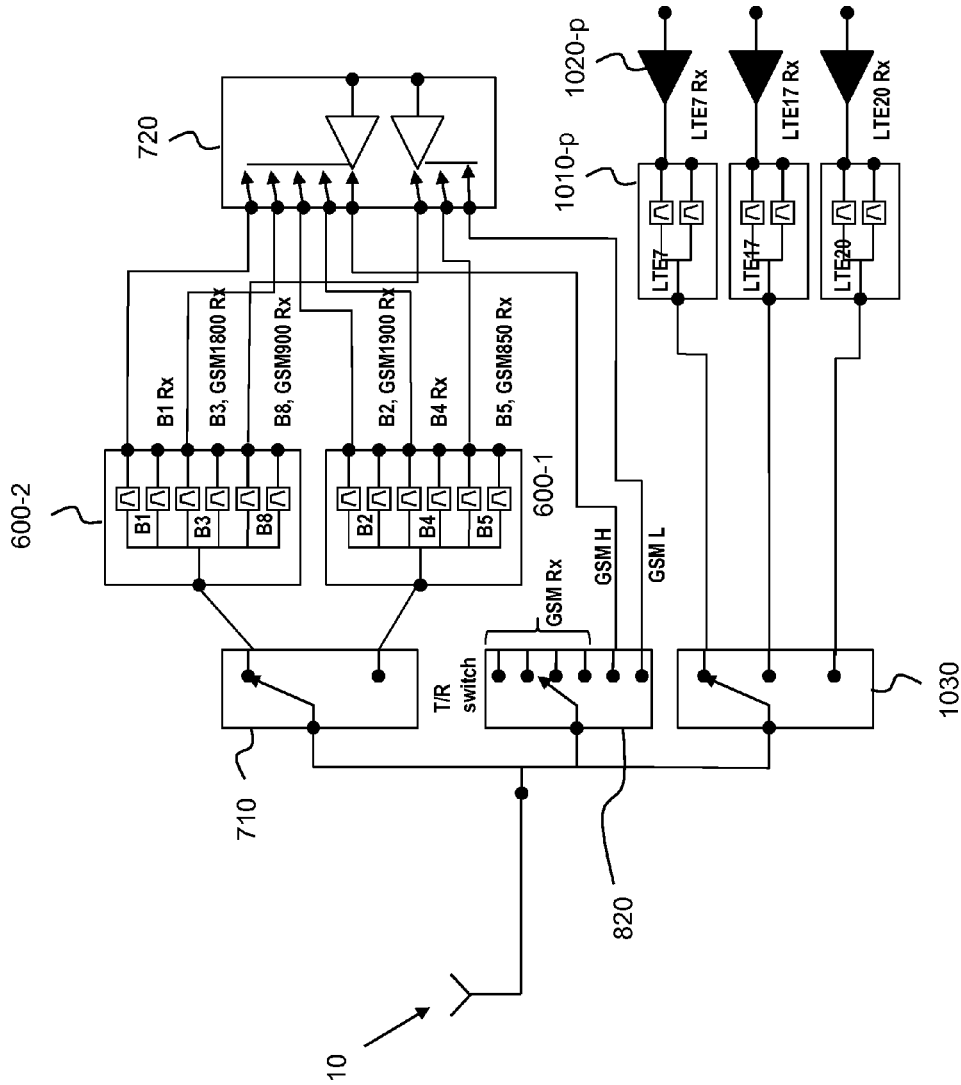
FIG. 10 illustrates a fourth example embodiment of an arrangement for a transceiver front-end for a mobile telecommunication device that supports simultaneous operation in a plurality of different communication bands.

FIG. 10 illustrates a fourth example embodiment of an arrangement 1000 for a transceiver front-end for a mobile telecommunication device that supports simultaneous operation in a plurality of different communication bands. For brevity, only the differences between the arrangement 1000 in FIG. 10 and the arrangements described above will be described.

Arrangement 1000 extends the architectures described above to support Long Term Evolution (LTE) communications. In particular, arrangement 1000 includes duplexers 1010-$p$ (here, m (1,3)) each associated with a corresponding LTE transmit amplifier 1020-$p$ and a second electromechanical band switch 1030. Duplexers 1010-$p$ are each configured to allow bi-directional communication over a corresponding one of a third plurality of communication bands that each include a corresponding transmit band and a corresponding receive band, and second electromechanical band switch 1030 is configured to selectively connect one of the plurality of duplexers 1010-$p$ to antenna 10. Although arrangement 1000 shows support for LTE communication bands LTE7, LTE17 and LTE20, in other embodiments different or additional communication bands could be supported.

An alternative to arrangement 1000 with similar functionality could be provided by omitting second electromechanical band switch 1030, and instead adding additional poles (i.e., switched ports 715-*m*) to electromechanical band switch 710, and connecting one of the duplexers 1010-*p* to each of the added switched ports 715-*m*. In that case, electromechanical band switch 710 is further configured to selectively connect each of the duplexers 1010-*p* to antenna 10.

Figure 11:
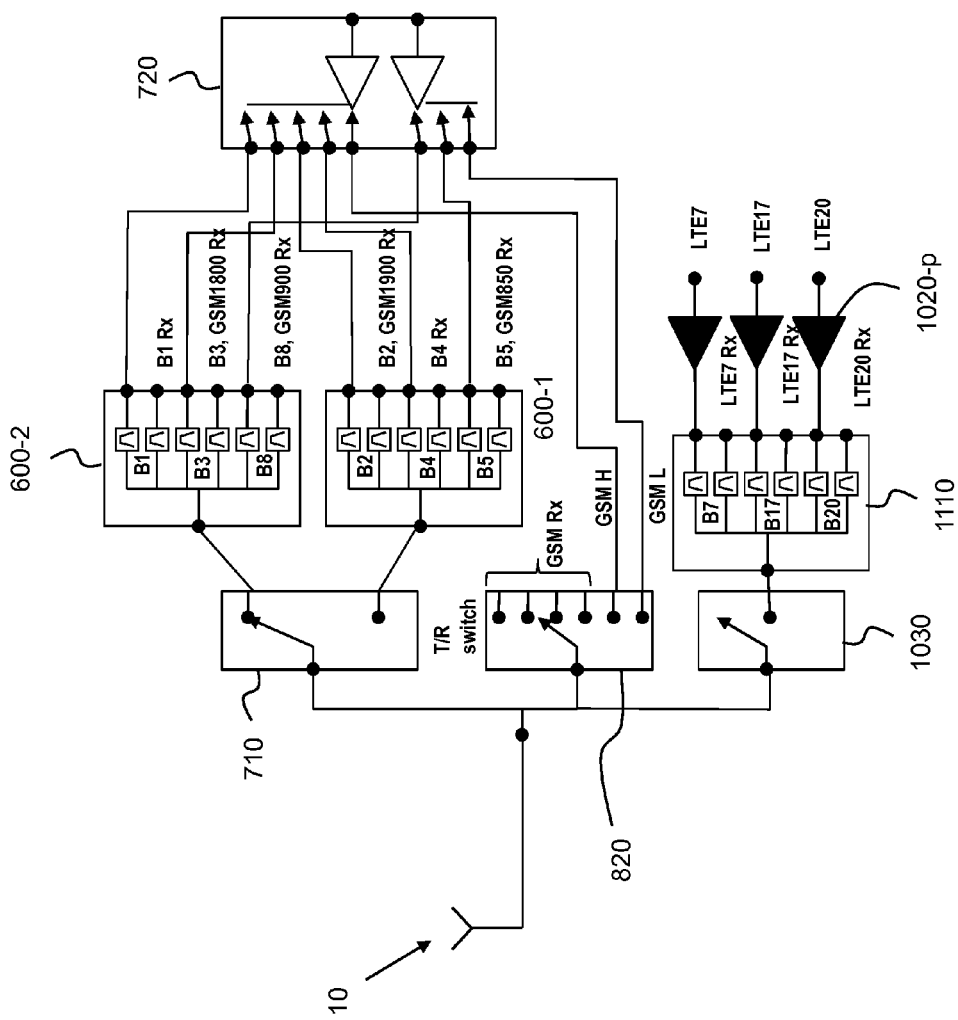
FIG. 11 illustrates a fifth example embodiment of an arrangement for a transceiver front-end for a mobile telecommunication device that supports simultaneous operation in a plurality of different communication bands.

FIG. 11 illustrates a fifth example embodiment of an arrangement 1100 for a transceiver front-end for a mobile telecommunication device that supports simultaneous operation in a plurality of different communication bands. For brevity, only the differences between the arrangement 1100 in FIG. 11 and the arrangements described above will be described.

In particular, arrangement 1100 is similar to arrangement 1000, except that the LTE communication bands are also multiplexed, similarly to the communication bands 2/4/5 and 1/3/8. Accordingly, duplexers 1010-*p* are replaced with a third multiplexer 1110 and second electromechanical band switch 1030 becomes a single pole, single throw switch. Third multiplexer 1110 is configured to allow bi-directional communication over a third plurality of multiplexed communication bands (e.g., LTE7, LTE17 and LTE20) that each include a corresponding transmit band and a corresponding receive band. As with first and second multiplexers 600-1 and 600-2, it is required that there be no overlap between the transmit frequencies of the transmit band of one communication band (e.g., LTE17) and the receive frequencies of the receive band of another communication band (e.g., LTE20) in third multiplexer 1110. Third electromechanical band switch 1110 is configured to selectively connect a common port of third multiplexer 1110 to antenna 10.

An alternative to arrangement 1100 with similar functionality could be provided by omitting second electromechanical band switch 1030, and instead adding an additional pole (i.e., switched port 715-*m*) to electromechanical band switch 710, and connecting the common port of third multiplexer 1110 to the added switched port 715-*m*. In that case, electromechanical band switch 710 is further configured to selectively connect third multiplexer 1110 to antenna 10.

Figure 12:
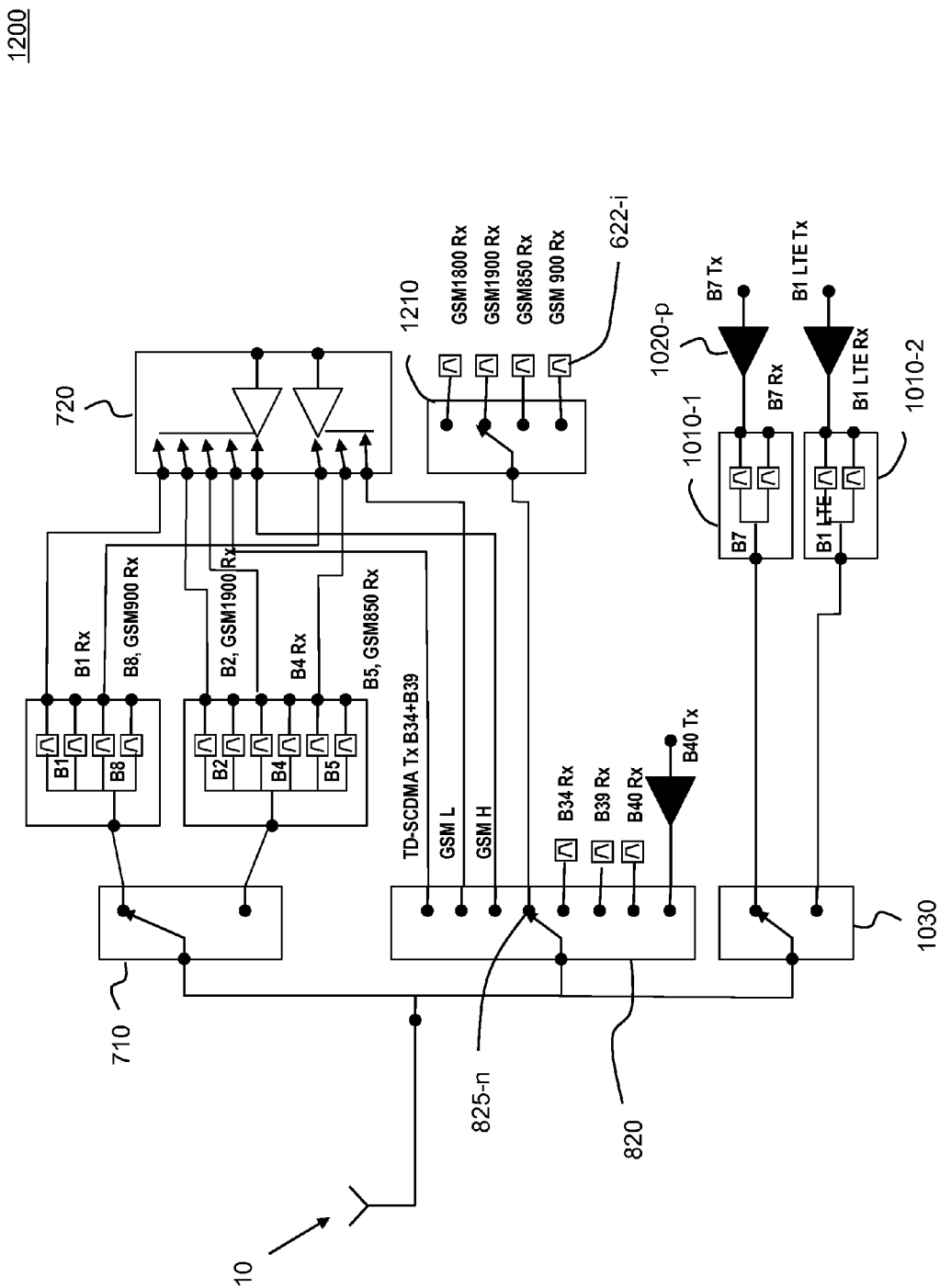
FIG. 12 illustrates a sixth example embodiment of an arrangement for a transceiver front-end for a mobile telecommunication device that supports simultaneous operation in a plurality of different communication bands.

FIG. 12 illustrates a sixth example embodiment of an arrangement 1200 for a transceiver front-end for a mobile telecommunication device that supports simultaneous operation in a plurality of different communication bands. For brevity, only the differences between the arrangement 1200 in FIG. 12 and the arrangements described above will be described.

In particular, arrangement 1200 is similar to arrangement 1000, with a principal difference being that arrangement 1200 includes an additional switch 1210 having a common port and a plurality of switched ports, wherein each of the switched ports of additional switch 1210 is connected to a corresponding receive bandpass filter 622-*i* for a corresponding receive band. The common port of the additional switch 1210 is connected to a switched port 825-*n* of electronic T/R switch 820.

While example embodiments are disclosed herein, one of ordinary skill in the art appreciates that many variations that are in accordance with the present teachings are possible and remain within the scope of the appended claims. The embodiments therefore are not to be restricted except within the scope of the appended claims.

The invention claimed is:

1. An apparatus, comprising:
a first multiplexer configured to allow bi-directional communication over a first plurality of multiplexed communication bands that each include a corresponding transmit band and a corresponding receive band, the first multiplexer comprising a plurality of bandpass filters, each of the plurality of bandpass filters of the first multiplexer corresponding to one of the transmit bands of the first multiplexer or one of the receive bands of the first multiplexer, wherein none of the transmit bands of the first multiplexer have transmit frequencies that overlap with any receive frequencies of any of the receive bands of the first multiplexer;
a second multiplexer configured to allow bi-directional communication over a second plurality of multiplexed communication bands that each include a corresponding transmit band and a corresponding receive band, the second multiplexer comprising a plurality of bandpass filters, each of the plurality of bandpass filters of the second multiplexer corresponding to one of the transmit bands of the second multiplexer or one of the receive bands of the second multiplexer, wherein none of the transmit bands of the second multiplexer have transmit frequencies that overlap with any receive frequencies of any of the receive bands of the second multiplexer;
a transmit amplifier module comprising a plurality of outputs, at least a first one of the outputs being connected to one of the plurality of bandpass filters of the first multiplexer for one of the transmit bands of the first multiplexer, and at least a second one of the outputs being connected to one of the plurality of bandpass filters of the second multiplexer for one of the transmit bands of the second multiplexer; and
an electromechanical band switch configured to selectively connect the first and second multiplexers to a common antenna.

2. The apparatus of claim 1, wherein the electromechanical band switch is a radio frequency (RF) microelectromechanical system (MEMS) switch.

3. The apparatus of claim 1, further comprising an electronic switch comprising a common port and a plurality of switched ports, including at least a first switched port connected to a power amplifier module and configured to receive a transmit signal, and further including at least a second switched port connected to a receiver for a time-division duplex (TDD) signal, and wherein the electromechanical band switch is further configured to selectively connect the common port of the electronic switch to the common antenna.

4. The apparatus of claim 1, wherein the first plurality of communication bands are allocated within the United States for mobile telecommunications, and the second plurality of communication bands are allocated in Europe for mobile telecommunications.

5. The apparatus of claim 1, further comprising an electronic switch comprising a common port and a plurality of switched ports, including at least a first switched port connected to a transmit amplifier module and configured to receive a transmit signal, and further including at least a second switched port connected to a receiver for a time-division duplex (TDD) signal, and wherein the common port of the electronic switch is connected to the common antenna.

6. The apparatus of claim 5, further comprising:
a plurality of duplexers each configured to allow bi-directional communication over a corresponding one of a third plurality of communication bands that each include a corresponding transmit band and a corresponding receive band; and
a second electromechanical band switch configured to selectively connect one of the plurality of duplexers to a common antenna.

7. The apparatus of claim 5, further comprising:
a plurality of duplexers each configured to allow bi-directional communication over a corresponding one of a third plurality of communication bands that each include a corresponding transmit band and a corresponding receive band,
wherein the electromechanical band switch is further configured to selectively connect each of the plurality of duplexers to the common antenna.

8. The apparatus of claim 5, further comprising:
a third multiplexer configured to allow bi-directional communication over a third plurality of multiplexed communication bands that each include a corresponding transmit band and a corresponding receive band, wherein none of the transmit bands of the third multiplexer have transmit frequencies that overlap with any receive frequencies of any of the receive bands of the third multiplexer; and
a second electromechanical band switch configured to selectively connect the third multiplexer to the common antenna.

9. The apparatus of claim 5, further comprising:
a third multiplexer configured to allow bi-directional communication over a third plurality of multiplexed communication bands that each include a corresponding transmit band and a corresponding receive band, wherein none of the transmit bands of the third multiplexer have transmit frequencies that overlap with any receive frequencies of any of the receive bands of the third multiplexer.
wherein the electromechanical band switch is further configured to selectively connect the third multiplexer to the common antenna.

10. The apparatus of claim 5, further comprising:
an additional switch comprising a common port and a plurality of switched ports, wherein each of the switched ports of the additional switch is connected to a corresponding receive bandpass filter for a corresponding receive band,
wherein the electronic switch includes at least a third switched port, and
wherein the common port of the additional switch is connected to the third switched port of the electronic switch.

11. An apparatus, comprising:
one or more receivers;
one or more transmit amplifiers;
a first multiplexer comprising a common port, a plurality of transmit ports connected to the one or more transmit amplifiers, and a plurality of receive ports connected to the one or more receivers;
a second multiplexer comprising a common port, a plurality of transmit ports connected to the one or more transmit amplifiers, and a plurality of receive ports connected to the one or more receivers;
an electronic switch comprising a common port and at least three switched ports, including at least a first switched port connected to a transmit amplifier module and configured to receive a transmit signal, and further comprising at least a second switched port connected to a receiver for a time-division duplex (TDD) signal,
wherein the common port of the electronic switch is connected to a common antenna;
an additional switch comprising a common port and a plurality of switched ports, wherein each of the switched ports of the additional switch is connected to a corresponding receive bandpass filter for a corresponding receive band, wherein the common port of the additional switch is connected to a third switched port of the plurality of switched ports of the electronic switch; and
an electromechanical band switch configured to selectively connect the first and second multiplexers to the common antenna.

12. The apparatus of claim 11, wherein each of the transmit ports of the first multiplexer is configured to pass transmit frequencies in a corresponding transmit band to the common port of the first multiplexer, and wherein each of the receive ports of the first multiplexer is configured to receive frequencies in a corresponding receive band from the common port of the first multiplexer, wherein none of the transmit frequencies of any of the transmit bands overlap any of the receive frequencies of any of the receive bands.

13. The apparatus of claim 11, wherein the apparatus is configured to simultaneously:
transmit via the antenna a first transmit signal supplied by the one or more transmit amplifiers to a first one of the transmit ports of the first multiplexer;
transmit via the antenna a second transmit signal supplied by the one or more transmit amplifiers to a second one of the transmit ports of the first multiplexer;
receive via the antenna a first receive signal supplied to the one or more receivers from a first one of the receive ports of the first multiplexer; and
receive via the antenna a second receive signal supplied to the one or more receivers from a second one of the receive ports of the first multiplexer.

14. The apparatus of claim 11, wherein the electromechanical band switch is a radio frequency (RF) microelectromechanical system (MEMS) switch.

15. An apparatus, comprising:
a first multiplexer configured to allow bi-directional communication over a first plurality of multiplexed communication bands that each include a corresponding transmit band and a corresponding receive band, wherein none of the transmit bands of the first multiplexer have transmit frequencies that overlap with any receive frequencies of any of the receive bands of the first multiplexer;
a second multiplexer configured to allow bi-directional communication over a second plurality of multiplexed communication bands that each include a corresponding transmit band and a corresponding receive band, wherein none of the transmit bands of the second multiplexer have transmit frequencies that overlap with any receive frequencies of any of the receive bands of the second multiplexer, wherein the first multiplexer includes a plurality of bandpass filters, each of the plurality of bandpass filters of the first multiplexer corresponding to one of the transmit bands of the first multiplexer or one of the receive bands of the first multiplexer, and wherein the second multiplexer also includes a plurality of bandpass filters, each of the plurality of bandpass filters of the second multiplexer corresponding to one of the transmit bands of the second multiplexer or one of the receive bands of the second multiplexer;

an electromechanical band switch configured to selectively connect the first and second multiplexers to a common antenna; and a transmit amplifier module comprising a plurality of outputs, at least two of the outputs being connected to two corresponding bandpass filters of the first multiplexer for two of the transmit bands of the first multiplexer.

16. The apparatus of claim 15, further comprising an electronic switch comprising a common port and a plurality of switched ports, including at least a first switched port connected to a power amplifier module and configured to receive a transmit signal, and further including at least a second switched port connected to a receiver for a time-division duplex (TDD) signal, and wherein the electromechanical band switch is further configured to selectively connect the common port of the electronic switch to the common antenna.

17. The apparatus of claim 15, wherein the first plurality of communication bands are allocated within the United States for mobile telecommunications, and the second plurality of communication bands are allocated in Europe for mobile telecommunications.

18. The apparatus of claim 15, wherein the electromechanical band switch is a radio frequency (RF) microelectromechanical system (MEMS) switch.

19. The apparatus of claim 15, further comprising an electronic switch comprising a common port and a plurality of switched ports, including at least a first switched port connected to a transmit amplifier module and configured to receive a transmit signal, and further including at least a second switched port connected to a receiver for a time-division duplex (TDD) signal, and wherein the common port of the electronic switch is connected to the common antenna.

20. The apparatus of claim 19, further comprising:

a plurality of duplexers each configured to allow bi-directional communication over a corresponding one of a third plurality of communication bands that each include a corresponding transmit band and a corresponding receive band; and a second electromechanical band switch configured to selectively connect one of the plurality of duplexers to a common antenna.

21. The apparatus of claim 19, further comprising:

a plurality of duplexers each configured to allow bi-directional communication over a corresponding one of a third plurality of communication bands that each include a corresponding transmit band and a corresponding receive band, wherein the electromechanical band switch is further configured to selectively connect each of the plurality of duplexers to the common antenna.

22. The apparatus of claim 19, further comprising:

a third multiplexer configured to allow bi-directional communication over a third plurality of multiplexed communication bands that each include a corresponding transmit band and a corresponding receive band, wherein none of the transmit bands of the third multiplexer have transmit frequencies that overlap with any receive frequencies of any of the receive bands of the third multiplexer; and a second electromechanical band switch configured to selectively connect the third multiplexer to the common antenna.

23. The apparatus of claim 19, further comprising:

a third multiplexer configured to allow bi-directional communication over a third plurality of multiplexed communication bands that each include a corresponding transmit band and a corresponding receive band, wherein none of the transmit bands of the third multiplexer have transmit frequencies that overlap with any receive frequencies of any of the receive bands of the third multiplexer, wherein the electromechanical band switch is further configured to selectively connect the third multiplexer to the common antenna.

* * * * *